United States Patent
Hikawa

[11] Patent Number: 5,646,988
[45] Date of Patent: Jul. 8, 1997

[54] INCOMING CALL CONTROLLER FOR PREFERENTIALLY CONNECTING A WAITING CALL BASED ON NUMBER OF PREVIOUS UNSUCCESSFUL CALL ATTEMPTS

[75] Inventor: Kenichi Hikawa, Kawasaki, Japan

[73] Assignee: Fujitsu Limited, Kanagawa, Japan

[21] Appl. No.: 730,806

[22] Filed: Oct. 17, 1996

Related U.S. Application Data

[63] Continuation of Ser. No. 323,862, Oct. 17, 1994, abandoned.

[30] Foreign Application Priority Data

Mar. 18, 1994 [JP] Japan .................................. 6-049470

[51] Int. Cl.$^6$ ..................................... H04Q 3/64
[52] U.S. Cl. ................. 379/266; 379/265; 379/309
[58] Field of Search ............................. 379/265, 266, 379/211, 212, 207, 201, 142, 309, 112

[56] References Cited

U.S. PATENT DOCUMENTS

| | | | |
|---|---|---|---|
| 5,185,786 | 2/1993 | Zwick | 379/309 |
| 5,214,688 | 5/1993 | Szlam et al. | 379/112 |
| 5,245,651 | 9/1993 | Takashima et al. | 379/142 |
| 5,278,898 | 1/1994 | Cambray et al. | 379/309 |
| 5,282,243 | 1/1994 | Dabbaghi et al. | 379/211 |
| 5,303,304 | 4/1994 | Takahata | 379/142 |
| 5,311,574 | 5/1994 | Livanos | 379/142 |
| 5,313,517 | 5/1994 | Inaguma | 379/212 |

*Primary Examiner*—Krista M. Zele
*Assistant Examiner*—Scott Wolinsky
*Attorney, Agent, or Firm*—Helfgott & Karas, P.C.

[57] ABSTRACT

An incoming call controller for preferentially connecting a waiting calling subscriber, who had previously made more unsuccessful call attempts than any other waiting calling subscriber, to a called subscriber. The unsuccessful call attempts result in the calling subscriber receiving a busy signal. Call registering apparatus within the incoming call controller store identification data of each particular calling subscriber or calling terminal receiving a busy signal. After identification data is registered, the call register indicates future unsuccessful call attempts by incrementing a data field comprising the number of unsuccessful call attempts of the particular calling subscriber or calling terminal. A call manager within the incoming call controller identifies the calling subscriber registered as having previously made the most unsuccessful call attempts. When a line to the called subscriber becomes available, the calling subscriber or calling terminal identified by the call manager is connected to the called subscriber and the data field associated with the number of unsuccessful call attempts by the calling subscriber is reset.

16 Claims, 15 Drawing Sheets

| SUBSCRIBER'S PHONE NUMBER | NUMBER OF INCOMPLETE CALLS |
|---|---|
| DN1 | 5 |
| DN2 | 12 |
| DN3 | 16 |
| ... | ... |

FIG. 5

| PRIORITY | NUMBER OF INCOMPLETE CALLS | SUBSCRIBER'S PHONE NUMBER | CALLING TERMINAL PHONE NUMBER | INDEX |
|---|---|---|---|---|
| 1 | X1 | DNa | DN1 | I1 |
| 2 | X2 | DNb | DN2 | I2 |
| 3 | X3 | DNc | DN3 | I3 |
| ⋮ | ⋮ | ⋮ | ⋮ | ⋮ |

FIG. 6

| TERMINAL IDENTIFIER | STATE IDENTIFIER |
|---|---|
| A | Busy |
| B | Idle |
| ⋮ | ⋮ |

FIG. 7

MAIN QUEUE REGISTERING SECTION

| PRIORITY | NUMBER OF INCOMPLETE CALLS | SUBSCRIBER'S PHONE NUMBER | CALLING TERMINAL PHONE NUMBER | INDEX |
|---|---|---|---|---|
| 1 | $X1$ | DNa | DN1 | $I1$ |
| 2 | $X2$ | DNb | DN2 | $I2$ |
| 3 | $X3$ | DNc | DN3 | $I3$ |
| ⋮ | ⋮ | ⋮ | ⋮ | ⋮ |
| FLAG | POINTER ; P1 | | | |

SUB-QUEUE REGISTERING SECTION

| PRIORITY | NUMBER OF INCOMPLETE CALLS | SUBSCRIBER'S PHONE NUMBER | CALLING TERMINAL PHONE NUMBER | INDEX |
|---|---|---|---|---|
| N | $X_N$ | DNp | $DN_N$ | $I_N$ |
| ⋮ | ⋮ | ⋮ | ⋮ | ⋮ |

FIG. 12

| SUBSCRIBER'S PHONE NUMBER | NUMBER OF INCOMPLETE CALLS | WAITING QUEUE REGISTERING HISTORY IDENTIFICATION FLAG |
|---|---|---|
| DN1 | 5 | 0 |
| DN2 | 12 | 0 |
| DN3 | 16 | 1 |
| ⋮ | ⋮ | ⋮ |

INCOMING CALL CONTROLLER FOR PREFERENTIALLY CONNECTING A WAITING CALL BASED ON NUMBER OF PREVIOUS UNSUCCESSFUL CALL ATTEMPTS

This is a continuation of application Ser. No. 08/323,862, filed Oct. 17, 1994, now abandoned.

BACKGROUND OF THE INVENTION

1. Field of the Invention

The present invention relates to an apparatus for preferentially connecting a telephone caller who has had many call attempts result in busy signals.

2. Description of the Related Art

Owing to the recent development of the information processing technology and communication technology, a system for making reservations for a concert ticket, golf course and the like over the phone has become popular.

In the system for making reservations for a concert ticket over the phone, for example, a plurality of telephone terminals are installed on the side of a distributor. The distributor then receives calls from purchasers over those telephone terminals and reserves concert tickets which the purchasers ask for. The purchasers can reserve preferable tickets by calling and talking with the distributor within a reservation time. This system has a merit that the purchasers need not go to shop and can make reservations from their own house or the like.

However, in the case of concert tickets, the terminals of the distributor are busy almost all the time during the time for application and the purchasers are obliged to make many calls before being connected to the terminal of the distributor. Although such communication services as queuing and call waiting for holding a certain number of calls until the terminals are cleared are being taken in to solve the aforementioned problem, the purchasers have to make still a plurality of phone calls in order to receive the queuing service or call waiting service even if those communication services are adopted. On the other hand, when a period of the call coincides with a period in which the terminals are cleared or with a transition period in which waiting queues in a busy state are put into an idle state, the purchaser can communicate with the terminal of the distributor by just making one call. That is, whether or not the communication is established is defined regardless of the number of calls which the purchaser has made and hence it is hard to say that the communication service is provided fairly.

SUMMARY OF THE INVENTION

Accordingly, it is an object of the present invention to solve the aforementioned problem by providing an incoming call controller which provides a fair communication service to each calling subscriber when a large number of calls are made to the same called subscriber, which happens when reservations for concert tickets or golf course are made over the phones.

In order to achieve the aforementioned object, the incoming call controller of the present invention has been adapted to control the connection of the calls by taking into account the number of calls not completed because the calling subscriber has encountered busy lines of the called subscriber. Specifically, the incoming call controller comprises waiting call registering means and waiting call managing means.

When the waiting call registering means recognizes that the line of the called subscriber has been cleared, it retrieves the waiting call registering means.

Waiting calls standing by for the end of communication of the called subscriber are registered in the waiting call registering means. Specifically, calling subscriber identification data for specifying a calling subscriber of a waiting call, calling terminal identification data for specifying a calling terminal and a number of calls rejected to be connected with the called subscriber (hereinafter referred to as "a number of incomplete calls") are registered in the waiting call registering means.

Then, the waiting call managing means discriminates a waiting call having the greatest number of incomplete calls among the waiting calls registered in the waiting call registering means and connects it with the called subscriber. Specifically, the waiting call managing means informs an exchange of the calling subscriber identification data for specifying the calling subscriber of the call or calling terminal identification data for specifying the calling terminal. Thereby, the exchange can connect the waiting call with the called subscriber.

By the way, because there is a limit in the storage capacity of the waiting call registering means, all waiting calls may not be registered in the waiting call registering means. Then, up to a predetermined number of waiting calls are registered in the waiting call registering section. When the waiting call managing means recognizes a call which has encountered the busy lines of the called subscriber, it determines whether or not the predetermined number of waiting calls has been registered in the waiting call registering section. When the predetermined number of waiting calls has been registered, the waiting call managing means cancels said call. On the other hand, when a number of waiting calls less than the predetermined number has been registered, the waiting call managing means registers said call in the waiting call registering means.

The present invention allows to preferentially connect a calling subscriber having the greater number of incomplete calls when a large number of calls are made to the same called subscriber which may happen when making reservations for concert tickets over the phones. That is, the present invention allows to control the connection with the called subscriber corresponding to an endeavor of the calling subscriber required in making the call.

The incoming call controller of the present invention may comprise, in addition to the waiting call registering means and waiting call managing means, offering history registering means and offering history managing means.

The offering history registering means registers history of calls which each calling subscriber has made to a specific called subscriber. This history of calls indicates a number of incomplete calls of the calling subscriber rejected to be connected with the called subscriber and is registered per calling subscriber identification data. The number of incomplete calls is reset when a communication between the calling subscriber and the called subscriber is established.

The offering history managing means functions to update the registered contents in the offering history registering means. That is, when the offering history managing means recognizes a call which has encountered busy lines of a predetermined called subscriber, it detects the calling subscriber identification data or calling terminal identification data of the call. Then the offering history managing means retrieves the offering history registering means, based on the calling subscriber identification data or calling terminal identification data, to determine whether or not the calling subscriber has been registered. When the calling subscriber has been registered in the offering history registering means, the offering history managing means increments the number of incomplete calls of the calling subscriber by 1. If the calling subscriber has not been registered, the offering history managing means registers the calling subscriber identification data or calling terminal identification data and an initial value of the number of incomplete calls "1" in the offering history registering means.

It also gives a higher priority to a waiting call having a greater number of incomplete calls among each waiting call in the waiting call registering means. Then, when the waiting call managing means recognizes a call which has encountered the busy lines of the called subscriber, it activates the offering history managing means.

The offering history managing means retrieves the offering history registering means to determine whether or not the calling subscriber of said call has been registered. If the calling subscriber has been registered in the offering history registering means, the offering history managing means increments the number of incomplete calls "k" of the calling subscriber by 1. The waiting call managing means also informs the waiting call managing means of the number of incomplete calls after the update "k+1".

The waiting call managing means registers said call in the waiting call registering means by giving a priority. In giving the priority, the waiting call managing means compares the number of incomplete calls of said call "k+1" and the number of incomplete calls of the waiting calls registered in the waiting call registering means 1. Then, the waiting call managing means gives a priority higher than that of the waiting calls whose number of incomplete calls is less than "k+1" to said call.

A sub-area for temporarily storing waiting calls may be provided in the waiting call registering means in addition to a main area for registering up to the predetermined number of waiting calls. When the waiting call managing means recognizes a call which has encountered busy lines of a called subscriber, it detects calling subscriber identification data or calling terminal identification data of the call. It then informs the offering history managing means of the calling subscriber identification data or calling terminal identification data.

The offering history managing means retrieves the offering history registering means, based on the calling subscriber identification data or calling terminal identification data and increments the number of incomplete calls of the calling subscriber of the call by 1. Then, the offering history managing means informs the waiting call managing means of the updated number of incomplete calls.

The waiting call managing means retrieves the waiting call registering means to determine whether or not a waiting call having a less number of incomplete calls than that of said call exists. If the waiting call having a less number of incomplete calls than that of said call has been registered in the waiting call registering means, the waiting call managing means registers said call in the waiting call registering means. The waiting call whose priority has become the lowest due to the registration of said call is then registered in the sub-area of the waiting call registering means. At this time, the waiting call managing means registers a pointer or an address in the sub-area in the main area of the waiting call registering means.

On the other hand, if no waiting call having a less number of incomplete calls than that of said call exists, the waiting call managing means cancels said call.

The incoming call controller of the present invention may further comprise message sending means, in addition to the waiting call registering means and waiting call managing means.

The message sending means has a function of informing the calling subscriber of the waiting call of his priority. When the priority in the waiting call registering means is changed because lines of the called subscriber are cleared, a waiting call is canceled or a new waiting call is registered, the waiting call managing means informs the message sending means of the calling terminal identification data of the waiting call whose priority has been changed and of the changed priority.

Upon receiving the calling terminal identification data and changed priority of each waiting call from the waiting call managing means, the message sending means sends the priority to the calling terminal of each waiting call based on the calling terminal identification data. Thereby, the calling subscribers can recognize their own priority on real-time.

The incoming call controller of the present invention may comprise message sending means, in addition to the waiting call registering means, waiting call managing means, offering history registering means 3 and offering history managing means.

In this case, the message sending means is provided with functions of sending a message urging the calling subscriber who has made a call while the lines of the called subscriber have been busy to input the calling subscriber identification data and of informing the calling subscribers of the waiting calls of their priority.

When the waiting call managing means recognizes the call which has been encountered with the busy lines of the called subscriber, it activates the message sending means. The message sending means sends the message urging the calling subscriber of the call to input the calling subscriber identification data. When the calling subscriber identification data is sent in response to the message, the waiting call managing means informs the offering history managing means of the calling subscriber identification data.

The offering history managing means retrieves the offering history registering means to determine whether or not the calling subscriber identification data has been registered. If the calling subscriber identification data has been registered, the offering history managing means increments the number of incomplete calls of the calling subscriber by 1. The offering history managing means also informs the waiting call managing means of the updated number of incomplete calls.

The waiting call managing means determines whether or not the predetermined number of waiting calls has been registered in the waiting call registering means. If less number of waiting calls than the predetermined number have been registered in the waiting call registering means, the waiting call managing means registers said call in the waiting call registering means. The waiting call managing means also compares the number of incomplete calls of said call and that of the waiting calls registered in the waiting cal registering means. If there exists a waiting call having a less number of incomplete calls than that of said call, the waiting call managing means gives a priority higher than that of the waiting call to said call. The waiting call managing means also informs the message sending means of the calling terminal identification data and priority of said call and the calling terminal identification data and priority of the waiting call whose priority has been changed. The message sending means then informs each calling terminal of its priority.

When the predetermined number of waiting calls has been registered in the waiting call registering means, the waiting call managing means compares the number of incomplete calls of said call and that of the waiting calls registered in the waiting call registering means. If there exists a waiting call having less number of incomplete calls than that of said call, the waiting call managing means registers said call in the waiting call registering means and gives a priority higher than that of the waiting call to said call. Then, the waiting call managing means registers a waiting call having the lowest priority in the sub-area of the waiting call registering means. The waiting call managing means also informs the message sending means of the priority and calling terminal identification data of said call and the calling terminal identification data and changed priority of the waiting call whose priority has been changed. The message sending means informs each calling terminal of its priority.

When the predetermined number of waiting calls has been registered in the waiting call registering means and there exists no waiting call having less number of incomplete calls than that of said call, the waiting call managing means cancels said call.

Thereby, the calling subscriber can be registered in the waiting call registering means by making the call from any place.

The above and other related objects and features of the present invention will be apparent from a reading of the following description of the disclosure found in the accompanying drawings and the novelty thereof pointed out in the appended claims.

BRIEF DESCRIPTION OF THE DRAWINGS

FIG. 5 is table showing a specific example of an offering history registering section according to the second embodiment;

FIG. 6 is a table showing a specific example of a waiting queue registering section according to the second embodiment;

FIG. 7 is a sample of a management table of a called terminal state managing section according to the second embodiment;

FIG. 12 is a specific example of a waiting queue registering section according to a third embodiment;

FIG. 15 is a specific example of an offering history registering section according to a fourth embodiment.

DETAILED DESCRIPTION OF PREFERRED EMBODIMENTS

First Embodiment

Figure 1:
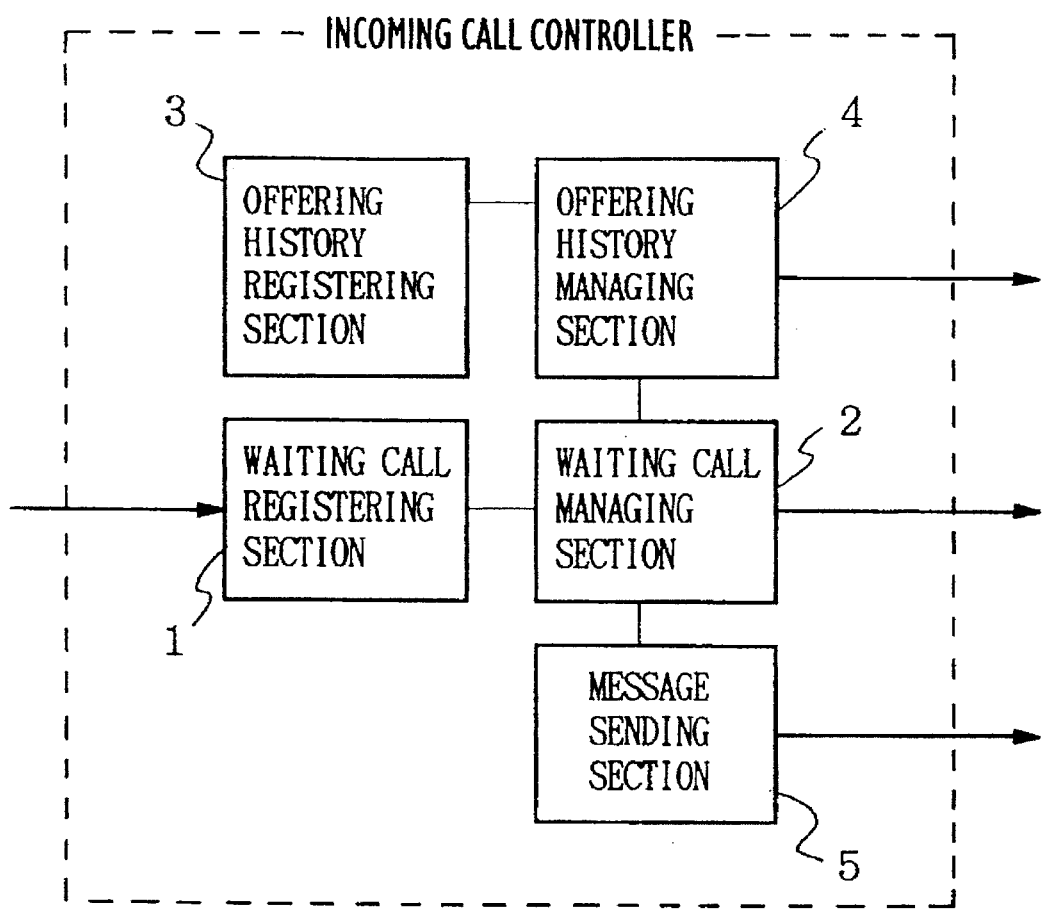
FIG. 1 is a functional block diagram of an incoming call controller according to a first embodiment of the present invention.

A first preferred embodiment of the present invention will be explained with reference to FIG. 1.

An incoming call controller of the first embodiment is an apparatus for controlling incoming of calls to a specific called terminal.

The incoming call controller of the first embodiment comprises a waiting call registering section 1 for registering waiting calls standing by for the called terminal to be cleared, a waiting call managing section 2 for managing contents of the waiting call registering section 1, an offering history registering section 3 for registering a calling history of each calling subscriber, an offering history managing section 4 for updating the contents of the offering history registering section 3 and a message sending section 5 for sending messages to the calling subscribers.

A function of each component described above will be explained below.

[Waiting Call Registering Section 1]

The waiting call registering section 1 registers waiting calls which wait until a line of a called subscriber is clear. Actually, the waiting call registering section 1 registers calling subscriber identification data for specifying the calling subscriber of the waiting call, calling terminal identification data for specifying the calling terminal of the waiting call and a number of call attempts in which the calling subscriber has received busy signals (hereinafter referred to as the 'number of incomplete calls').

The waiting call registering section 1 includes a main area for storing or registering up to a predetermined number of waiting calls and a sub-area for temporarily storing or registering waiting calls.

The calling subscriber identification data described above includes, for example, a password, code number or telephone number which the subscriber registers in the network. The calling terminal identification data is a telephone number or the like of the calling terminal. The number of incomplete calls indicates a number of attempted calls which have received busy signals to be placed in queue (waiting call registering means) to be communicated to the called subscriber. The waiting call registering section 1 gives a priority to each waiting call based on this number of incomplete calls. That is, a higher priority is given to a waiting call having a greater number of incomplete calls.

[Waiting Call Managing Section 2]

The waiting call managing section 2 coupled to the waiting call registering section 1 has a function of managing the registered contents in the waiting call registering section 1 as follows: When the waiting call managing section 2 recognizes a call which has encountered a busy line of the calling subscriber, it detects the calling subscriber identification data of the call. The waiting call managing section 2 then requests the waiting call registering section 1 to determine whether or not the calling subscriber identification data has been registered. If the calling subscriber identification data has been registered or stored in the waiting call registering section 1, the waiting call managing section 2 increments the number of incomplete calls stored together with the calling subscriber identification data by one. On the other hand, if the calling subscriber identification data has not been registered or stored in the waiting call registering section 1, the waiting call managing section 2 detects the number of incomplete calls of the calling subscriber from the offering history section 3 and registers this number of incomplete calls together with the calling subscriber identification data and calling terminal identification data.

The waiting call managing section 2 clears the information concerning the waiting call (i.e., calling subscriber identification data, calling terminal identification data and number of incomplete calls) from the waiting call registering section 1 when the calling subscriber cancels the waiting call.

When the waiting call managing section 2 recognizes that the line of the called subscriber has been cleared, it discriminates a waiting call having the highest priority (waiting call having the greatest number of incomplete calls) from the waiting call registering section 1 and informs an exchange of the calling subscriber identification data and calling terminal identification data of the call to request to connect the call with the line of the called subsriber. Then, when the exchange connects the waiting call with the line of the called subscriber, the waiting call managing section 2 clears the information concerning the above-mentioned waiting call from the waiting call registering secton 1.

Further, when a predetermined number of waiting calls has been already registered or stored in the main area of the waiting call registering section 1, the waiting call managing section 2 compares the number of incomplete calls of said call with the number of incomplete calls of the waiting calls registered in the waiting call registering section 1. If a waiting call having less number of incomplete calls than that of said call exists, the waiting call managing section 2 registers it in the waiting call registering section 1. When the call is registered in the waiting call registering section 1, a waiting call having the lowest priority is ousted from the main area of the waiting call registering section 1. The waiting call managing section 2 then registers the ousted waiting call in the sub-area of the waiting call registering section 1 and registers a pointer or address of the sub-area in the main area.

[Offering History Registering Section 3]

The offering history registering section 3 registers calling history of each calling subscriber. Specifically, while the number of incomplete calls indicates a number of calls rejected to be connected with the line of the called subscriber, the offering history registering section 3 registers the number of incomplete calls per calling subscriber identification data.

By the way, the registerd contents in the offering history registering section 3 is cleared at the point when a communication between the calling subscriber and the called subscriber is established.

[Offering History Managing Section 4]

The offering history managing section 4 has a function of managing the registered contents in the offering history registering section 3.

Specifically, when the offering history managing section 4 recognizes a call which has encountered a busy line of the called subscriber, it determines whether or not the calling subscriber of the call has been registered in the offering history registering section 3. If the calling subscriber has been registered in the offering history registering section 3, the offering history managing section 4 increments the number of incomplete calls of the calling subscriber by one.

The offering history managing section 4 also increments the number of incomplete calls of the calling subscriber by 2 when the calling subscriber registered in the waiting call registering section 1 has canceled the waiting call.

The contents registered in the offering history registering section 3 (i.e., calling subscriber identification data and number of incomplete calls) are cleared at the point when a communication between the calling subscriber and the called subscriber is established.

[Message Sending Section 5]

The message sending section 5 is coupled with the waiting call managing section and has a function of informing the calling subscribers of various information. Specifically, when the registered contents in the waiting call registering section 1 is updated, the message sending section 5 informs the calling subscribers of their priority after the update. Also, when a new waiting call is registered in the waiting call registering section 1, the message sending section 5 informs the calling subscriber of the waiting call of his priority. The message sending section 5 also sends a message urging the calling subscriber who has encountered the busy line of the called subscriber to input his calling subscriber identification data.

The operation of the incoming call controller of the first embodiment will be explained below.

[Operation of Incoming Call Controller]

When the incoming call controller of the present embodiment recognizes the call which has encountered the busy line of the called subscriber, it activates the message sending section 5.

The message sending section 5 sends the message urging the calling subscriber of the call to input the calling subscriber identification data.

When the calling subscriber identification data is sent from the calling subscriber, the waiting call managing section 2 informs the offering history managing section 4 of this calling subscriber identification data.

The offering history managing section 4 requests the offering history registering section 3 to determine whether or not the calling subscriber identification data has been registered.

If the calling subscriber identification data has been already registered, the offering history managing section 4 increments the number of incomplete calls of the calling subscriber by 1 and informs the waiting call managing section 2 of the incremented number of incomplete calls.

The waiting call managing section 2 compares the number of incomplete calls of the calling subscriber and the number of incomplete calls of waiting calls registered in the waiting call registering section 1, and at the same time, determines whether or not a predetermined number of waiting calls has been registered in the waiting call registering section 1.

When the predetermined number of waiting calls has been registered and when a waiting call having less number of incomplete calls than that of the calling subscriber exists, the waiting call managing section 2 registers the call of the calling subscriber in the waiting call registering section 1. Then, the waiting call managing section 2 gives a priority higher than that of the waiting call having less number of incomplete calls to said call. At this time, the waiting call which has been given the lowest priority is temporarily stored or registered in the sub-area of the waiting call registering section 1.

When the predetermined number of waiting calls has been registered and no waiting call having less number of incomplete calls than that of the calling subscriber exists, the waiting call managing section 2 cancels the call of the calling subscriber.

When a number of waiting calls less than the predetermined number have been registered, the waiting call managing section 2 registers the call from the calling subscriber in the waiting call registering section 1. When there exists a waiting call having less number of incomplete calls than that of said call, the waiting call managing section 2 gives a higher priority to said call rather than to the waiting call. On the other hand, when no waiting call having less number of incomplete calls than that of said call exists, the waiting call managing section 2 gives the lowest priority to said call.

Next, when the waiting call managing, section 2 recognizes that the line of the called subscriber has been cleared, it retrieves the waiting call registering section I and discriminates a call having the highest priority. Then, the waiting call managing section 2 informs the exchange of the calling subscriber identification data and calling terminal identification data of the waiting call to cause it to connect with the line of the called subscriber. Then, the waiting call managing section 2 clears the information on the waiting call from the waiting call registering section 1.

When the calling subscriber of the waiting call cancels the call, the waiting call managing section 2 clears the information on the call from the waiting call registering section 1 and informs the offering history managing section 4 of the calling subscriber identification data.

The offering history managing section 4 retrieves the offering history registering section 3 based on the calling subscriber identification data and increments the number of incomplete calls of the calling subscriber by 2.

Second Embodiment

Figure 2:
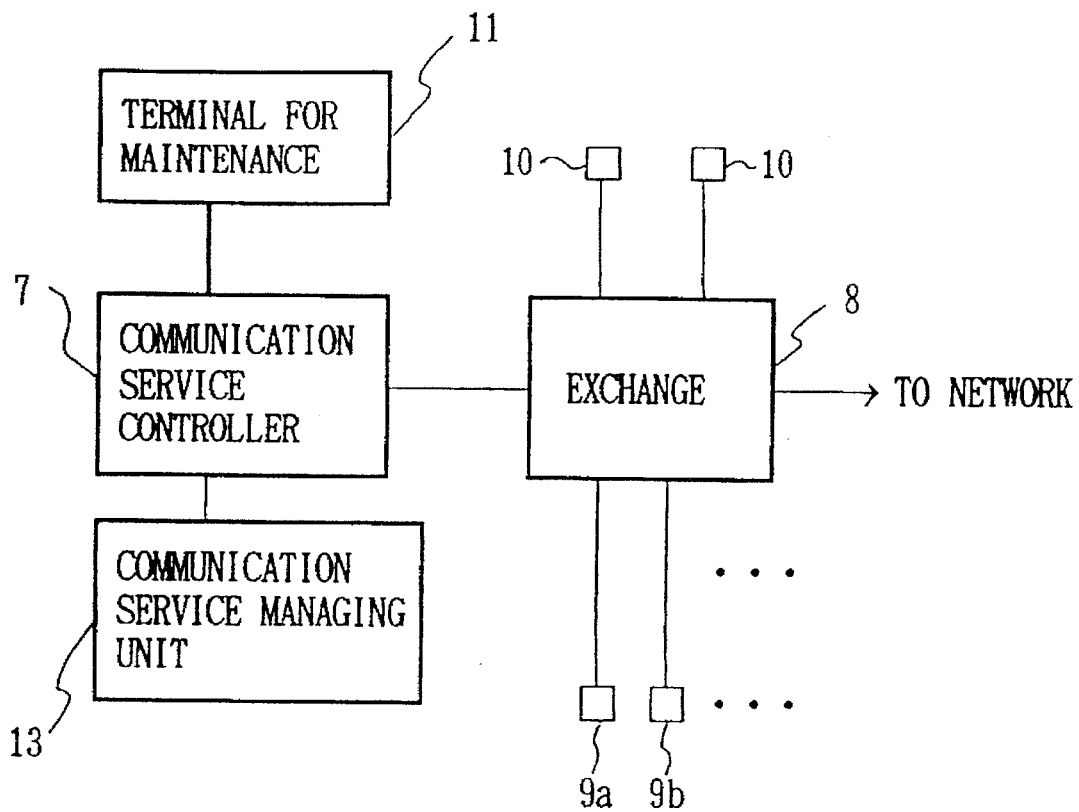
FIG. 2 is a schematic block diagram of a structure of a communication network according to a second embodiment.

FIG. 2 shows a schematic structure of a communication network according to a second embodiment.

In the communication network of the second embodiment, a communication service controller 7 is connected to an exchange 8 for accommodating with a plurality of telephone terminals 9a, 9b and 10. The communication service controller 7 is also connected with a terminal for maintenance 11 and a communication service managing unit 13.

The communication service managing unit 13 manages a communication service program operative in the communication service controller 7 and various data and activates and registers services.

The terminal for maintenance 11 is a terminal for maintaining the communication service controller 7.

In the present embodiment, a called terminal A (9a) and called terminal B (9b) among the terminals connected with the exchange 8 are disposed on the side of the distributor of concert tickets. The calling terminal 10 is assumed to be a telephone terminal which a purchaser of the concert ticket uses.

Figure 3:
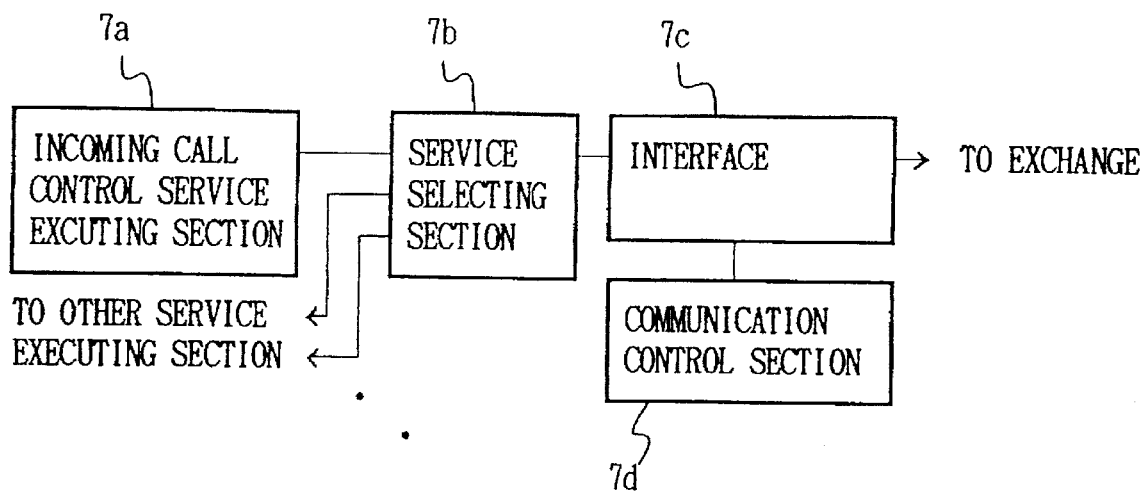
FIG. 3 is a block diagram of an internal structure of a communication service controller according to the second embodiment.

FIG. 3 is a functional block diagram showing an internal structure of the communication service controller 7. The communication service controller 7 of the second embodiment comprises an interface 7c, communication control section 7d for transmitting/receiving signals between the exchange 8, service selecting section 7b for selecting a communication service to be executed to a call when it is generated, and incoming call control service executing section 7a.

The incoming call control service executing section 7a is an example embodying the incoming call controller of the present invention and is activated by the service selecting section 7b. However, the incoming call control service executing section 7a is activated only during the application time for making reservations for concert tickets.

[Structure of Incoming Call Control Service Executing Section]

Figure 4:
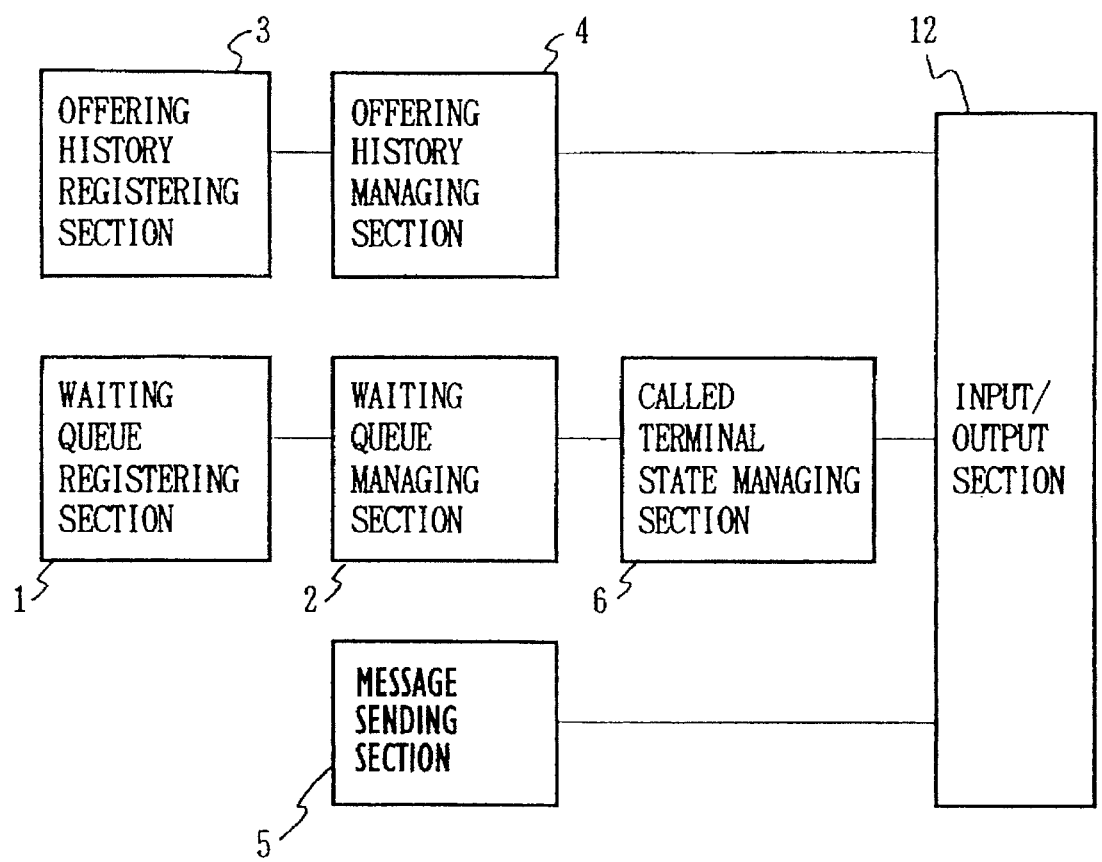
FIG. 4 is a functional block diagram of an incoming call control service executing section according to the second embodiment.

FIG. 4 is a functional block diagram showing an internal structure of the incoming call control service executing section 7a of the second embodiment.

The function of the incoming call control service executing section 7a is realized by a processor which executes programs stored in a memory and it comprises an input/output section 12, offering history registering section 3, offering history managing section 4, waiting queue registering section 1, waiting queue managing section 2, message sending section 5 and called terminal state managing section 6.

The offering history registering section 3 stores or registers per each calling subscriber, a number of calls lost because they have been made while the called terminal A (9a) or 9b was busy. In the present embodiment, a subscriber's phone number which the calling subscriber registers, is used as the calling subscriber identification data for specifying each calling subscriber and the number of incomplete calls is registered per each subscriber's phone number (see FIG. 5). The subscriber's phone number and number of incomplete calls registered in the offering history registering section 3 are cleared at the point when a communication between the calling subscriber and the called subscriber is established.

The offering history managing section 4 updates the registered contents in the offering history registering section 3. Specifically, when the offering history managing section 4 recognizes a call made when the called terminal A (9a) or the called terminal B (9b) was busy, it increments the number of incomplete calls by 1 if the calling subscriber of the call has been registered in the offering history registering section 3 and newly registers the subscriber's phone number of the calling subscriber and the number of incomplete calls "1" if the calling subscriber of the call has not been registered.

The waiting queue registering section 1 registers the call which has been made while the called terminal A (9a) or the called terminal B (9b) has been busy and which should have been put on standby for the called terminal A (9a) or the called terminal B (9b) to be cleared. Specifically, the waiting queue registering section 1 stores or registers the subscriber's phone number for identifying the calling subscriber of the call, calling terminal identification data for specifying the calling terminal of the call, number of incomplete calls, priority and index (see FIG. 6).

The calling terminal identification data is information for identifying a terminal used by the calling subscriber. In the present embodiment, a phone number of a calling terminal is used as the calling terminal identification data.

The priority is an order for designating an order of connection made with the called terminal A (9a) or the called terminal B (9b) and a higher priority is given to a waiting call having a greater number of incomplete calls. By giving this priority, a waiting call having the greatest number of incomplete calls may be connected when the called terminal A (9a) or the called terminal B (9b) is cleared.

The index is information for specifying an area in the offering history registering section 3 where the number of incomplete calls which corresponds to each waiting call is stored or registered.

The waiting queue managing section 2 has a function of updating the registered contents in the waiting queue registering section 1 and of selecting a call to be connected with the called terminal A (9a) or the called terminal B (9b) from the offering history registering section 3 when the called terminal A (9a) or the called terminal B (9b) is cleared and of specifying this call to the exchange 8.

The called terminal state managing section 6 has a management table (see FIG. 7) for registering states of the called terminal A (9a) and the called terminal B (9b) and manages whether they are in a busy state or idle state. When the called terminal A (9a) (or the called terminal B (9b)) which has been busy is cleared and shifts to a connectable state, the called terminal state managing section 6 informs the waiting queue managing section 2 that the called terminal A (9a) (or the called terminal B (9b)) has been cleared.

The message sending section 5 has a function of issuing commands to the exchange 8 to send a voice message or a display message. Incidentally, the message sending section informs the exchange 8 of the calling terminal phone number for identifying the calling terminal when it issues the command to the exchange 8 to send the voice message.

The above-mentioned message is selected from the following three messages:

1) message for urging the calling subscriber to input his subscriber's phone number;

2) message for informing the calling subscribers who have been registered in the waiting queue registering section 1 of their individual priority; and 3) message for informing the calling subscribers registered in the waiting queue registering section 1 that the application time for making reservations for concert tickets has been finished.

The above-mentioned message (1) is a message which is issued before the calling subscriber of the call which has been made while the called terminal A (9a) or the called terminal B (9b) has been busy is registered in the offering history registering section 3 and the message sending section 5 has a function to direct the exchange 8 to send such message.

The message (2) is a message issued when the priority of waiting calls registered in the waiting queue registering section 1 is changed and the message sending section 5 has a function to direct the exchange 8 to send such message.

The message (3) is a message when the application time for making reservations for the concert ticket is finished.

[Operation of Incoming Call Control Service Executing Section]

Now the operation of the incoming call control service executing section 7a of the second embodiment will be explained.

Figure 8:
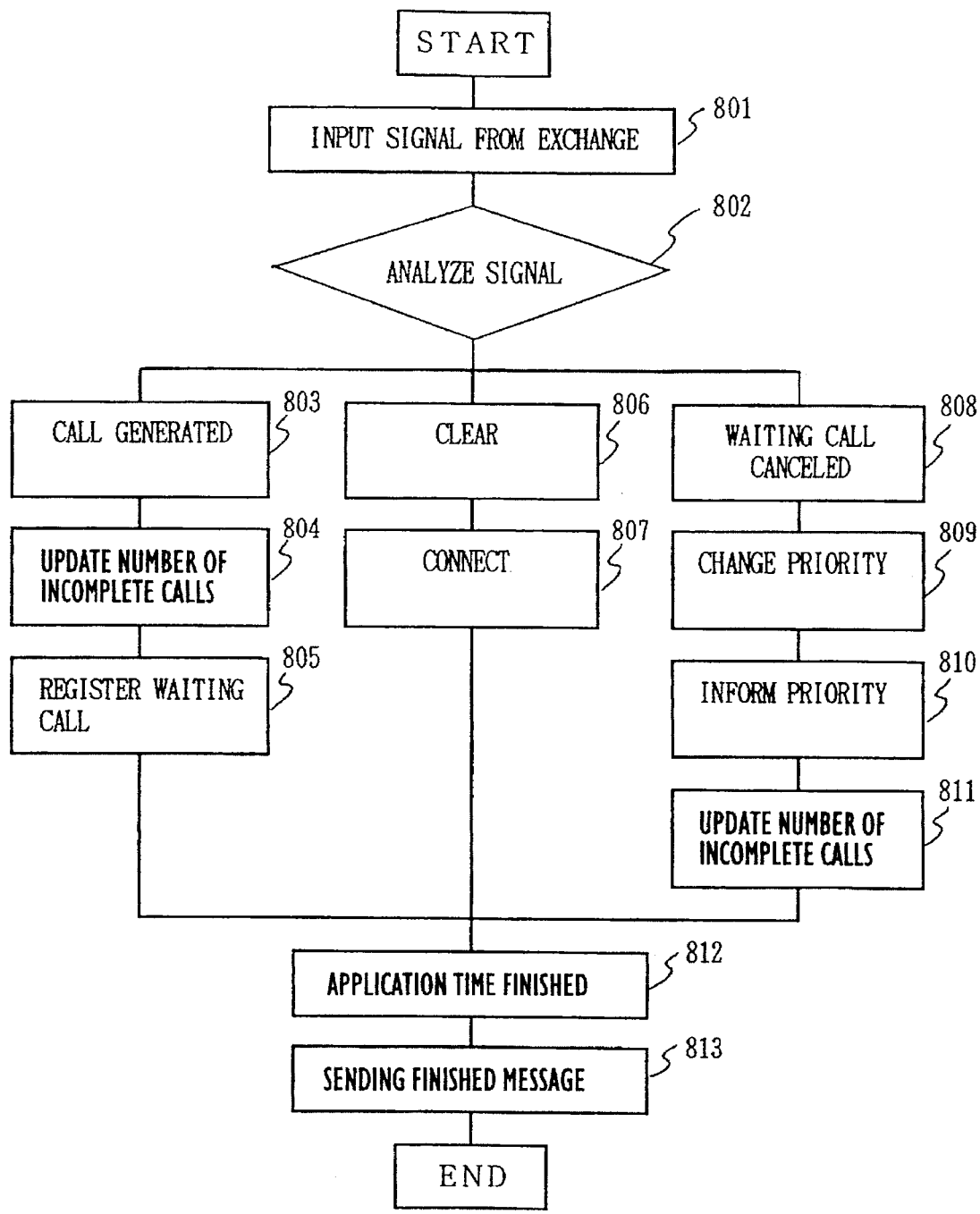
FIG. 8 is a flowchart showing an operation process of the incoming call controller according to the second embodiment.

FIG. 8 is a flowchart showing the operation pattern of the incoming call control service executing section 7a.

The incoming call control service executing section 7a is activated when the application for making reservations for concert tickets is started.

When a call is made to the called terminal A (9a) and the called terminal B (9b) installed at the site of the distributor of the concert tickets, the exchange 8 connects this call to the called terminal A (9a) or called terminal B (9b). When the state of the called terminal A (9a) or called terminal B (9b) changes from a connectable state to a busy state or from the busy state to the connectable state, the exchange 8 informs the incoming call control service executing section 7a of these changes of state.

When the called terminal state managing section 6 of the incoming call control service executing section 7a receives information about the changes of state of the called terminal A (9a) or called terminal B (9b) from the exchange 8, it rewrites the state identifier in the management table.

When the exchange 8 recognizes the call which has been made when the called terminal A (9a) and the called terminal B (9b) have been busy, it informs the incoming call control service executing section 7a through the service selecting section 7b of the generation of the call.

Further, when the call registered in the waiting queue registering section 1 is disconnected, the exchange 8 informs the incoming call control service executing section 7a of the subscriber's phone number of the call and a signal indicating the disconnection of the call.

Here, when the incoming call control service executing section 7a receives the signal from the exchange 8 (Step 801), it analyzes the signal and discriminates attributes of the signal (Step 802).

When the signal from the exchange 8 is a signal indicating that the call has been made to the called terminal A (9a) or the called terminal B (9b) which has been busy (Step 803), the incoming call control service executing section 7a executes a process for updating a number of incomplete calls of the calling subscriber of that call (Step 804). Next, the incoming call control service executing section 7a executes a waiting call registering process based on the updated number of incomplete calls (Step 805).

When the signal from the exchange 8 is a signal informing that the called terminal A (9a) or the called terminal B (9b) has been cleared (Step 806), the incoming call control service executing section 7a executes a process for connecting the waiting call (Step 807).

When the signal from the exchange 8 is a signal informing of the disconnection of a waiting call registered in the waiting queue registering section 1 (Step 808), the waiting queue managing section 2 of the incoming call control service executing section 7a clears data of the waiting call from the waiting queue registering section 1 and changes a priority of other waiting calls (Step 809).

Then, the waiting queue managing section 2 informs the message sending section 5 of the calling terminal phone number for specifying the calling terminal of the waiting call whose priority has been changed and the changed priority and, at the same time, informs the offering history managing section 4 of an index value of the calling subscriber who has disconnected the waiting call.

The message sending section 5 requests the exchange 8 to send the message for informing of the changed priority. In more detail, the message sending section 5 informs the exchange 8 of the calling terminal phone number of the waiting call whose priority has been changed and the changed priority. The exchange 8 discriminates the calling terminal to which the message should be sent based on the calling terminal phone number. Then, the exchange 8 sends a voice message or display message for informing each calling terminal of the priority (Step 810).

On the other hand, the offering history managing section 4 retrieves the offering history registering section 3 based on the index value informed from the waiting queue managing section 2. Then, the offering history managing section 4 increments the number of incomplete calls of the calling subscriber who has disconnected his waiting call by 2 (Step 811).

When the application time for making reservations for concert tickets is up (Step 812), the message sending section 5 informs the exchange 8 of the calling terminal phone number of waiting calls registered in the waiting queue registering section 1.

The exchange 8 then sends the voice message informing the calling terminals specified by the calling terminal phone numbers that the application time has been ended (Step 813).

Figure 9:
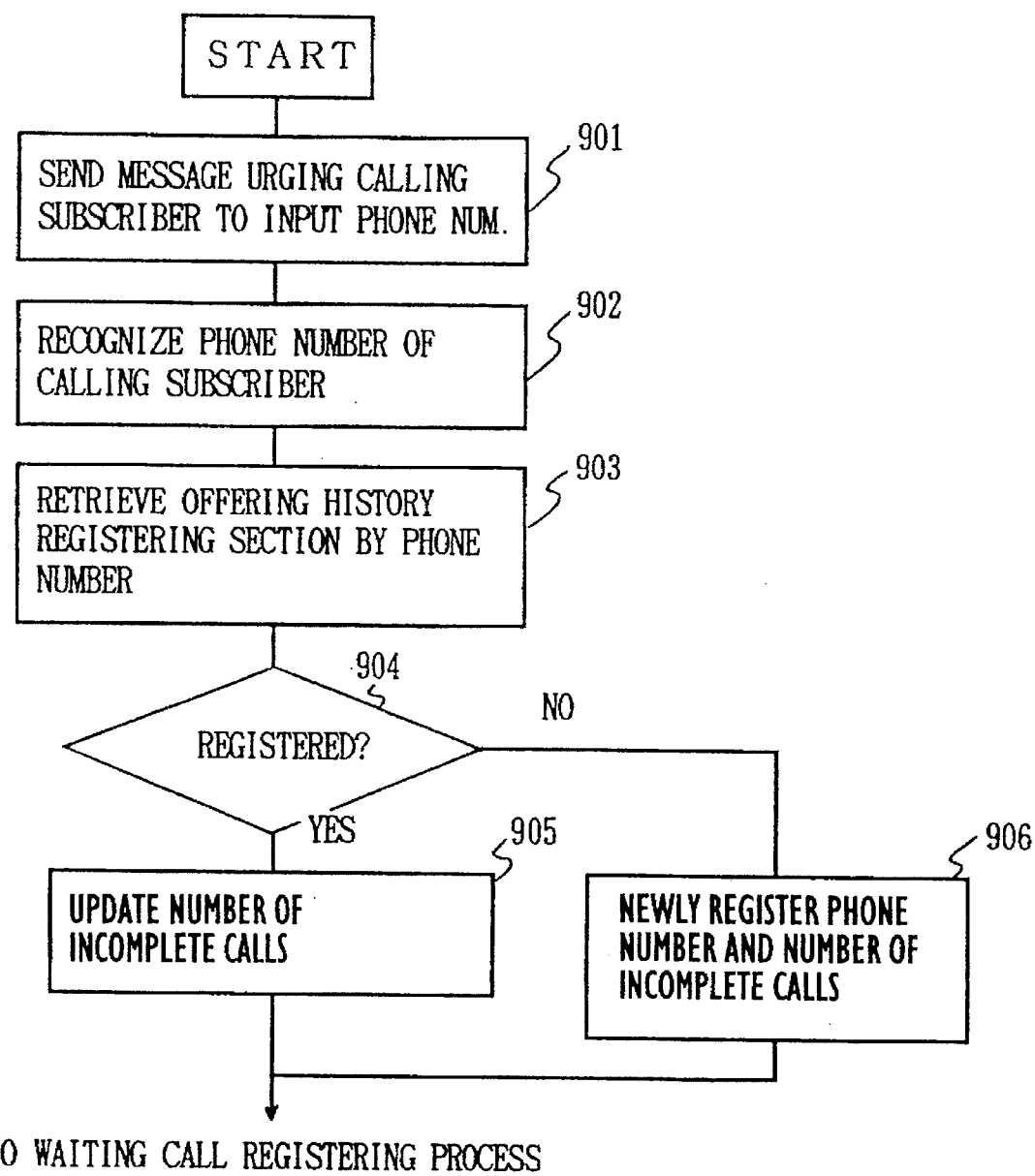
FIG. 9 is a flowchart showing a process for updating a number of incomplete calls.

Now the process for updating the number of incomplete calls in Step 804 above will be explained along a flowchart shown in FIG. 9.

When the incoming call control service executing section 7a is informed that the call which has been made while the called terminal A (9a) or the called terminal B (9b) has been busy is generated, it activates the waiting queue managing section 2.

The waiting queue managing section 2 activates the message sending section 5 to cause it to send the message, prompting the calling subscriber of the call to input his subscriber's phone number (Step 901).

When the waiting queue managing section 2 receives the subscriber's phone number from the calling subscriber (Step 902), it informs the offering history managing section 4 of the subscriber's phone number.

The offering history managing section 4 retrieves the offering history registering section 3 based on the subscriber's phone number (Step 903) to discriminate whether or not it has been registered (Step 904).

If the subscriber's phone number has been registered in the offering history registering section 3, the offering history managing section 4 increments the number of incomplete calls registered together with the subsriber's phone number by 1 (Step 905).

On the other hand, if the subscriber's phone number has not been registered in the offering history registering section 3, the offering history managing section 4 newly registers the subscriber's phone number and an initial value "1" of the number of incomplete calls (Step 906).

After executing Step 905 or 906 above, the offering history managing section 4 also informs the waiting queue managing section 2 of the updated number of incomplete calls or the newly registered initial value "1". Then, the waiting queue managing section 2 executes the waiting call registering process shown in the aforementioned Step 805.

Figure 10:
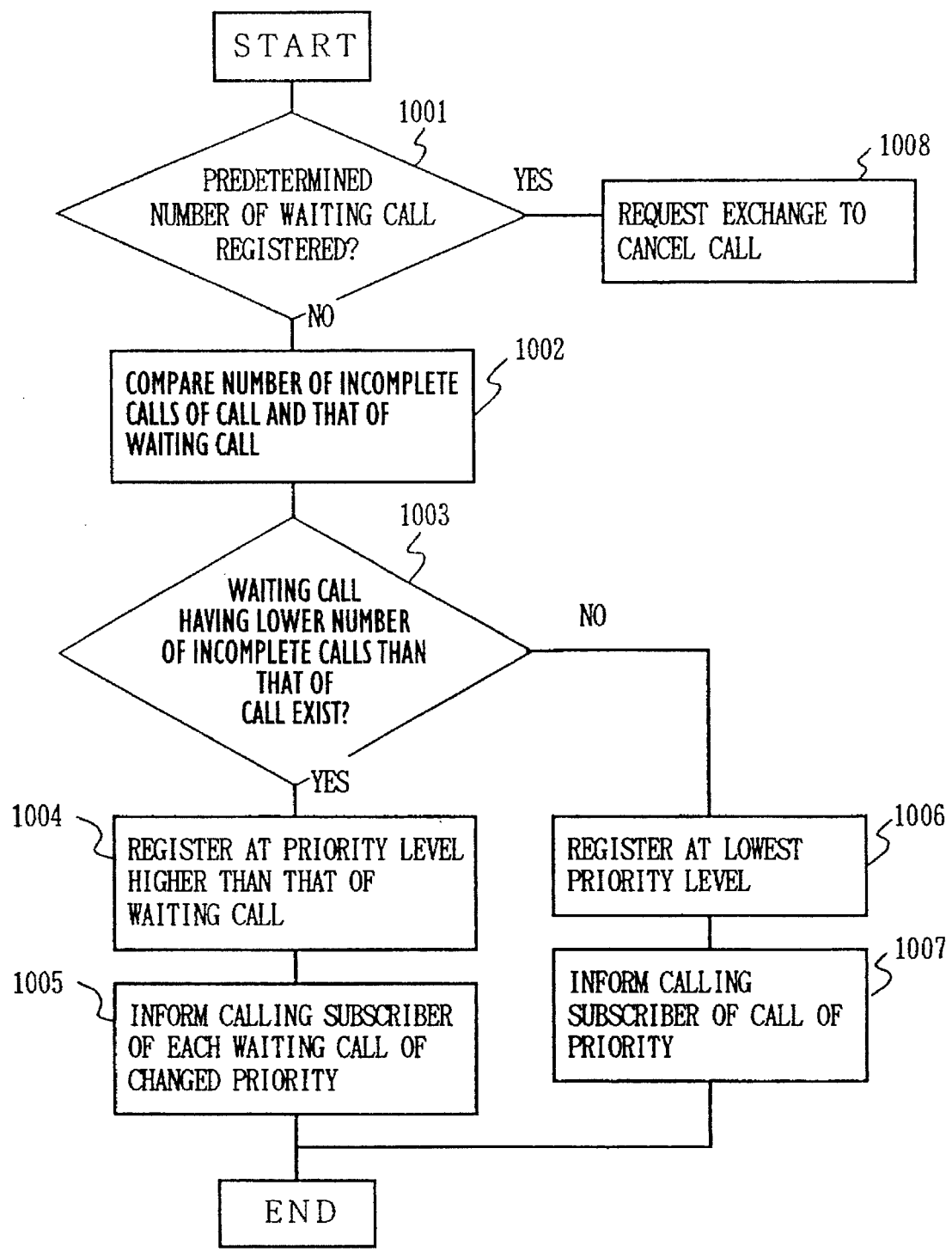
FIG. 10 is a flowchart showing a process for registering waiting calls.

FIG. 10 shows a flowchart showing the waiting call registering process.

When the waiting queue managing section 2 inputs the number of incomplete calls corresponding to the call from the offering history managing section 4, it makes reference to the waiting queue registering section 1 to discriminate whether a predetermined number of waiting calls have been registered or not (Step 1001).

If the number of waiting calls registered in the waiting queue registering section 1 is less than the predetermined number, the waiting queue managing section 2 compares the number of incomplete calls for the call and the number of incomplete calls of the waiting calls registered in the waiting queue registering section 1 (Step 1002, Step 1003).

If there exists a waiting call whose number of incomplete calls is less than that of said call, the waiting queue managing section 2 registers the call at a higher priority level than that of the waiting call (Step 1004).

Then, the waiting queue managing section 2 informs the message sending section 5 of the calling terminal phone number of the waiting call whose priority has been changed due to the registration of said call and the changed priority.

The message sending section 5 informs the exchange 8 of the calling terminal phone number and the priority to request to send a voice message or display message informing the priority (Step 1005).

If the predetermined number of waiting calls have been registered in the waiting queue registering section 1 in Step 1001, the waiting queue managing section 2 requests the exchange 8 to cancel said call. The exchange 8 sends a busy tone indicating that the called terminal A (9a) or the called terminal B (9b) is busy or a voice message informing the calling subscriber of the call that the connection cannot be made (Step 1008).

If no waiting call having less number of incomplete calls than that of the call exists in Stop 1003, the waiting queue managing section 2 registers said call at the lowest priority level (Step 1006). Then, the waiting queue managing section 2 informs the message sending section 5 of the calling terminal phone number and priority of said call.

The message sending section 5 informs the exchange 8 of the calling terminal phone number and priority of said call. Then, the exchange 8 sends the voice message or display message informing the calling terminal of said call of the priority of the calling subscriber (Step 1007).

Figure 11:
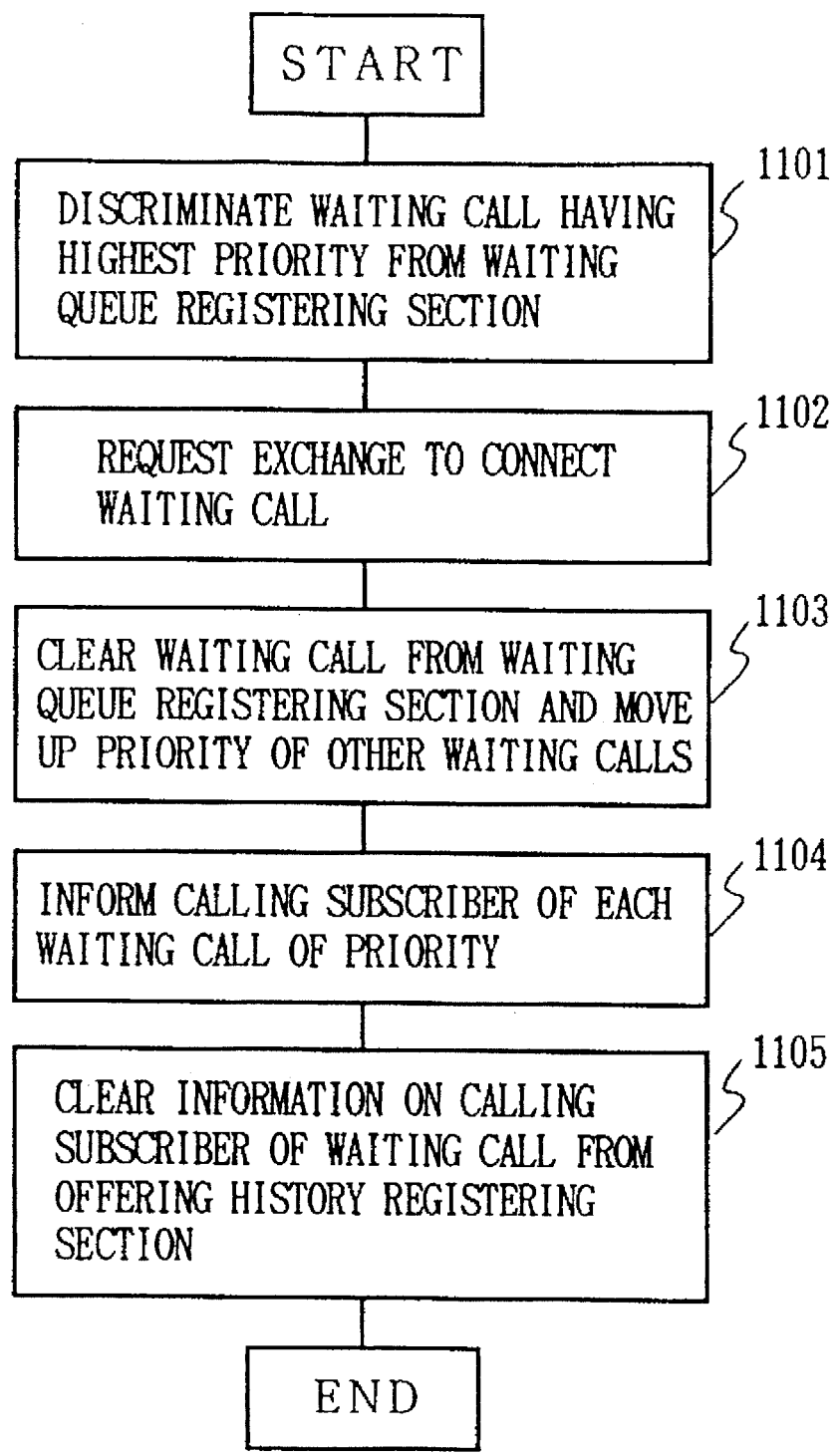
FIG. 11 is a flowchart showing a connection processing.

FIG. 11 shows a flowchart of the connection process shown in the aforementioned Step 806.

When the incoming call control service executing section 7a inputs the signal indicating that the called terminal A (9a) (or the called terminal B (9b)) has been cleared from the exchange 8, it activates the called terminal state managing section 6.

The called terminal state managing section 6 rewrites the state identifier of the called terminal A (9a) (or the called terminal B (9b)) in the management table from the identifier (Busy) indicating a state that the line is busy to the identifier (Idle) indicating a state that the line is connectable. The called terminal state managing section 6 informs the waiting queue managing section 2 that the called terminal A (9a) or the called terminal B (9b) has been cleared.

The waiting queue managing section 2 retrieves the waiting queue registering section 1 to discriminate a waiting call having the highest priority (Step 1101). Then, the waiting queue managing section 2 sends a request to the exchange 8 to connect the waiting call with the called terminal A (9a) (or the called terminal B (9b)) (Step 1102). Here, the exchange 8 discriminates the calling terminal based on the calling terminal phone number and connects the call from the calling terminal to the called terminal A (9a) (or the called terminal B (9b)).

The waiting queue managing section 2 also clears data concerning to the above waiting call from the waiting queue registering section 1 and moves up the priority of other waiting calls (Step 1103). At this time, the waiting queue managing section 2 reads the index in the waiting queue registering section 1. Then, the waiting queue managing section 2 informs the message sending section 5 of the calling terminal phone number and the moved up priority of each waiting call and informs the offering history managing section 4 of the above index.

The message sending section 5 sends the calling terminal phone number and priority to the exchange 8 and requests the exchange to send the message.

The exchange 8 discriminates the calling terminal of each waiting call based on the calling terminal phone number and sends the voice message or display message informing the calling terminals of their priority (Step 1104).

On the other hand, the offering history managing section 4 retrieves the offering history registering section 3 based on the above index and clears data concerning the calling subscriber of the above waiting call (Step 1105).

As described above, the second embodiment allows to preferentially connect the waiting call having a greater number of incomplete calls among the calling subscribers and to provide a service in which an endeavor of the calling subscriber necessary in calling is fairly taken account.

While not shown in the flowchart in FIG. 10, the waiting queue managing section 2 has a function of updating the number of incomplete calls of the waiting calls registered in the waiting queue registering section 1 at certain intervals. Corresponding to that, the offering history managing section 4 updates the number of incomplete calls of the calling subscribers of the waiting calls registered in the waiting queue registering section 1 among the calling subscribers registered in the offering history registering section 3.

Third Embodiment

FIG. 12 shows a structure of the waiting queue registering section 1 according to a third embodiment.

The waiting queue registering section 1 includes a main queue registering section and a sub-queue registering section.

The main queue registering section registers up a predetermined numbers of waiting calls. The sub-queue registering section is an extended area for registering waiting calls which cannot be registered in the main queue registering section. Specifically, when a call made from a calling subscriber having a greater number of incomplete calls than that of some waiting calls of the predetermined number of waiting calls which have been registered in the main queue registering section, the incoming call control-service executing section 7a of the third embodiment registers this call in the main queue registering section by cutting in it. Because waiting call registered at the lowest level of the main queue registering section cannot be registered at the time, this call which cannot be registered is registered in the sub-queue registering section in the third embodiment.

The main queue registering section also stores a flag for discriminating whether a waiting call has been registered in the sub-queue registering section and a pointer for specifying a registered position waiting call in the sub-queue registering section.

The waiting queue managing section 2 makes reference to the flag in the main queue registering section when it updates the registered contents of the waiting queue registering section 1 to discriminate whether any waiting call has been registered in the sub-queue registering section. If a waiting call has been registered in the sub-queue registering section, the waiting queue managing section 2 can access the waiting call in the sub-queue registering section following to the pointer.

Because the structure of the third embodiment is the same as that of the second embodiment except the waiting queue registering section 1, its explanation will be omitted here.

[Operation of Incoming Call Control Service Executing Section]

Figure 13:
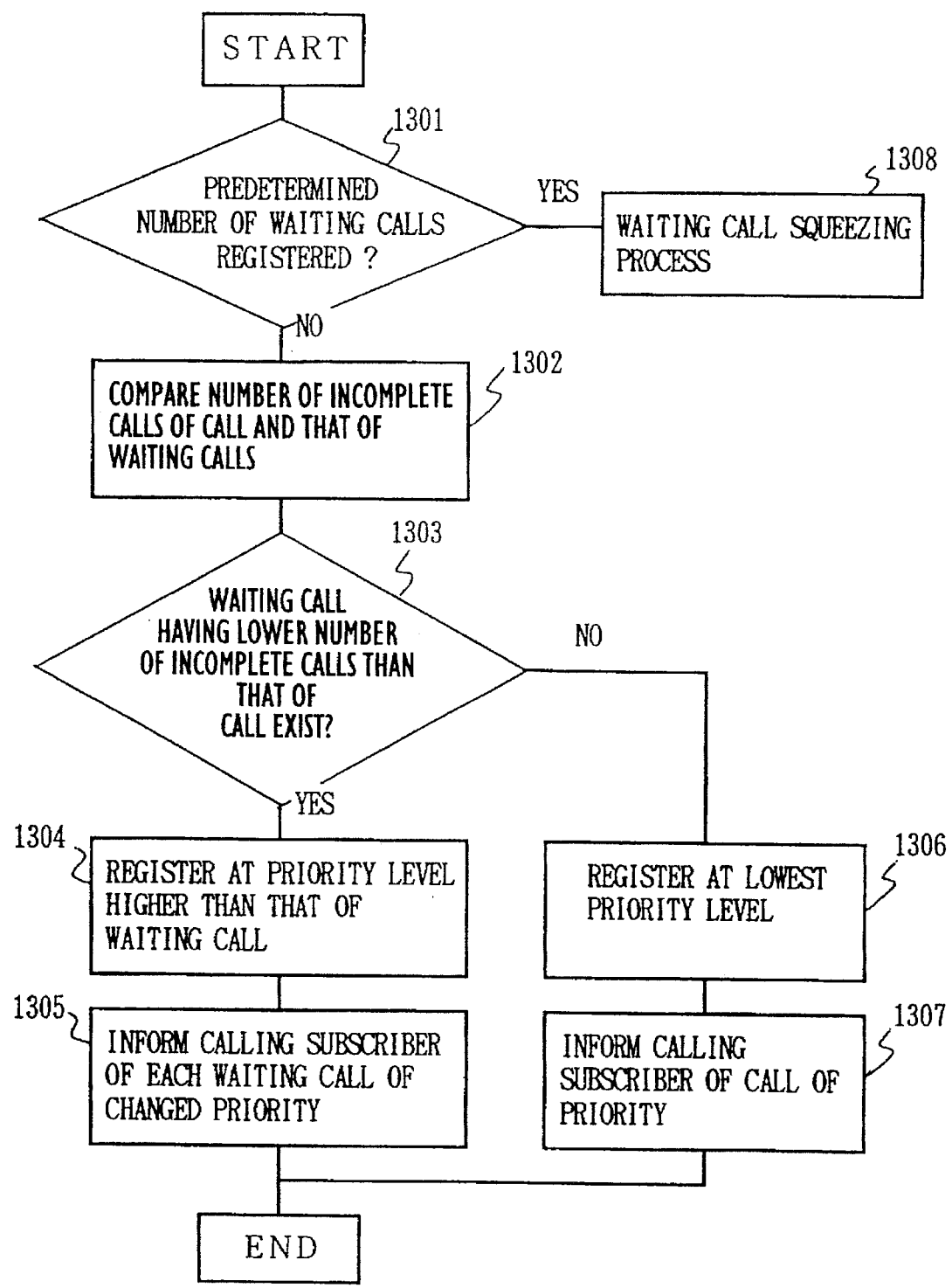
FIG. 13 is a flowchart showing a waiting call registering process according to the third embodiment.

A waiting call registering process of the incoming call control service executing section 7a of the third embodiment will be explained along a flowchart shown in FIG. 13.

When the waiting queue managing section 2 is informed of the number of incomplete calls of the call which has been made while the called terminal A (9a) (or the called terminal B (9b)) has been busy from the offering history managing section 4, it makes reference to the main queue registering section in the waiting queue registering section 1 to discriminate whether or not the predetermined number of waiting calls have been registered (Step 1301).

If a number of waiting calls registered in the main queue registering section of the waiting queue registering section 1 is less than the predetermined number, the waiting queue managing section 2 compares the number of incomplete calls of said call with that of the waiting calls registered in the main queue registering section (Step 1302, Step 1303).

If there exists a waiting call having less number of incomplete calls than that of said call, the waiting queue managing section 2 registers said call at the higher priority level rather than the waiting call (Step 1304). Then, the waiting queue managing section 2 informs the message sending section 5 of the calling terminal phone number and priority of the waiting call whose priority has been changed.

The message sending section 5 sends a request, together with the informed calling terminal phone number and priority, to the exchange 8 to send a message to the calling subscriber.

The exchange 8 discriminates the calling terminal based on the calling terminal phone number and sends a voice message or a display message informing of the changed priority (Step 1305).

If the predetermined number of waiting calls has been registered in the main queue registering section of the waiting queue registering section 1 in the aforementioned Step 1301, the waiting queue managing section 2 executes the waiting call cut-in process (Step 1308).

If no waiting call having less number of incomplete calls than that of said call exists in the aforementioned Step 1303, the waiting queue managing section 2 registers said call at the lowest priority level in the main queue registering section (Step 1306). The waiting queue managing section 2 then informs the message sending section 5 of the calling terminal phone number and priority of said call.

The message sending section 5 sends the request, together with the calling terminal phone number and priority of said call, to the exchange 8 to send a message. The exchange 8 discriminates the calling terminal of said call based on the calling terminal phone number and sends the voice message or thr display message informing the calling terminal of its priority (Step 1307).

Figure 14:
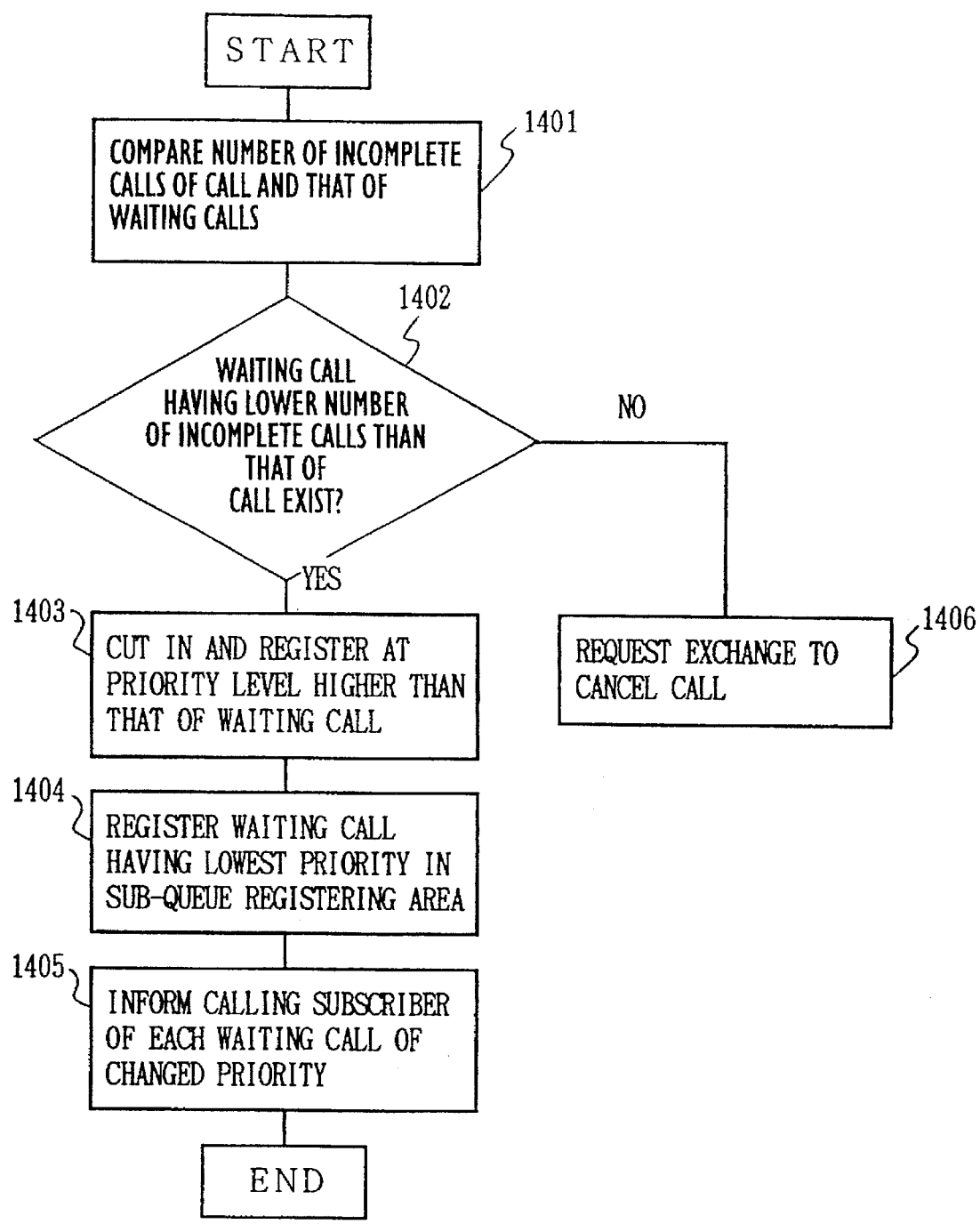
FIG. 14 is a flowchart showing a waiting call cut-in process.

Next, the waiting call cut-in process in the aforementioned Step 1308 will be explained with reference to a flowchart shown in FIG. 14.

The waiting queue managing section 2 compares the number of incomplete calls of said call and the number of incomplete calls of the waiting calls registered in the main queue registering section (Step 1401, Step 1402).

If there exists a waiting call having less number of incomplete calls than that of said call, the waiting queue managing section 2 registers said call at the higher priority level than that of the waiting call (Step 1404) and, at the same time, changes the registration of the waiting call whose priority has been lowered due to the cut-in registration from the main queue registering section to the sub-queue registering section (Step 1405). At this time, the waiting queue managing section 2 sets a flag in the main queue registering section and, at the same time, sets a pointer for specifying the registered position of the abovementioned waiting call in the sub-queue registering section.

The waiting queue managing section 2 discriminates the waiting call whose priority has been changed due to the cut-in registration and informs the message sending section 5 of the calling terminal phone number and changed priority of the waiting call.

The message sending section 5 sends a request, together with the calling terminal phone number and priority, to the exchange 8 to send a message informing the calling subscriber of his priority.

The exchange 8 discriminates the calling subscriber of the waiting call based on the calling terminal phone number and sends the voice message or display message informing the calling subscriber of his priority (Step 1405).

If no waiting call having less number of incomplete calls than that of said call exists in Step 1402, the waiting queue managing section 2 instructs the exchange 8 to cancel said call. The exchange 8 then sends to the calling subscriber of said call a busy tone indicating that the line of the called subscriber is busy or a voice message informing that the connection cannot be made (Step 1406).

As described above, the third embodiment allows to preferentially connect the calling subscriber having a greater number of incomplete calls to the waiting queue and thereby to preferentially connect the calling subscriber having the greater number of incomplete calls to the called terminal A (9a) (or the called terminal B (9b)).

Fourth Embodiment

According to a fourth embodiment, the incoming call control service executing section 7a registers a waiting queue registering history identification flag in the offering history registering section 3, differing from the second embodiment.

This waiting queue registering history identification flag is information set when a calling subscriber disconnects his waiting call in the waiting queue registering section 1 and resets when the calling subscriber calls again.

When the waiting queue managing section 2 recognizes a call from the calling subscriber whose waiting queue registering history identification flag has been set, it registers this call in the waiting queue registering section 1 regardless of its number of incomplete calls.

The other structure is the same as that of the second embodiment and its explanation will be omitted.

[Operation of Incoming Call Control Service Executing Section]

When the incoming call control service executing section 7a of the fourth embodiment recognizes a call which has been made while the called terminal A (9a) (or the called terminal B (9b)) has been busy, it activates the waiting queue managing section 2.

The waiting queue managing section 2 discriminates a calling subscriber of the call and informs the offering history managing section 4 of the calling subscriber identification data of the calling subscriber.

The offering history managing section 4 retrieves the offering history registering section 3 based on the calling subscriber identification data to discriminate whether or not the calling subscriber of the call has been registered.

If the calling subscriber has been registered in the offering history registering section 3, it reads a number of incomplete calls of the calling subscriber and, at the same time, discriminates whether or not the waiting queue registering history identification flag has been set.

When the waiting queue registering history identification flag is set for the calling subscriber, the offering history managing section 4 informs the waiting queue managing section 2 of this waiting queue registering history identification flag and the number of incomplete calls.

When the waiting queue managing section 2 receives the waiting queue registering history identification flag, it registers this call in the waiting queue registering section 1.

The procedure for registering it is the same as that of the second embodiment.

The fourth embodiment described above allows to register in the waiting queue registering section 1 by calling again even if the waiting call has been disconnected.

Accordingly, the incoming call controller of the present invention allows to realize a communication service which meets the endeavor of subscribers in calling when a large number of calls is made to the same called subscriber, for example, in making reservations for concert tickets or golf course.

That is, the incoming call controller of the present invention allows to preferentially connect the calling subscriber having a greater number of incomplete calls taking an account of the number of incomplete calls made to the called subscriber.

While preferred embodiments has been described, variations thereto will occur to those skilled in the art within in the scope of the present inventive concepts which are delineated by the following claims.

What is claimed is:

1. An incoming call controller comprising:
   waiting call registering means for registering a plurality of calls from calling subscribers waiting to be connected to a called subscriber; and
   waiting call managing means, coupled to said call registering means, for determining from said plurality of calls registered in said waiting call registering means, a waiting call from a calling subscriber who previously made the greatest number of unsuccessful call attempts to be connected with said called subscriber and for connecting said waiting call with said called subscriber.

2. The incoming call controller according to claim 1, wherein said waiting call registering means stores up to a predetermined number of waiting calls from calling subscribers and registers calling subscriber identification data for specifying the calling subscriber of each individual waiting call and a corresponding number of previous unsuccessful call attempts to be connected with said called subscriber.

3. The incoming call controller according to claim 1, wherein a higher priority is given to a waiting call registered in said waiting call registering means from a calling subscriber having previously made the greatest number of unsuccessful call attempts to be connected with said called subscriber.

4. The incoming call controller according to claim 1, further comprising:
   offering history registering means for registering and corresponding numbers of previously made calls rejected to be connected with said called subscriber to calling subscriber identification data for specifying each calling subscriber; and
   offering history managing means for updating the registered contents in said offering history registering means.

5. The incoming call controller according to claim 4, wherein said waiting call managing means executes, when a call from a calling subscriber whose connection to said called subscriber has previously produced a busy signal is made, the steps of:
   determining calling subscriber identification data for specifying a calling subscriber of said call;
   informing said offering history managing means of said calling subscriber identification data to update or newly register a number of previous incomplete calls of said calling subscriber in said offering history registering means;
   discriminating whether or not said call may be registered in said waiting call registering means;
   registering the calling subscriber identification data, calling terminal identification data and number of previous incomplete calls of said calling subscriber to said waiting call registering means if it is possible to register said call in said waiting call registering means; and
   canceling said call if it is impossible to register said call in said waiting call registering means.

6. The incoming call controller according to claim 5, wherein said offering history managing means executes, when it receives said calling subscriber identification data from said waiting call registering means, the steps of:

retrieving said offering history registering means based on said calling subscriber identification data to discriminate whether or not the number of previous incomplete calls of said calling subscriber has been registered;

updating the number of previous incomplete calls if the number of previous incomplete calls of said calling subscriber has been registered;

newly registering said calling subscriber identification data and an initial value of the number of previous incomplete calls if the number of the previous incomplete calls of said calling subscriber has not been registered; and informing said waiting call managing means of the initial value of said number of previous incomplete calls.

7. The incoming call controller according to claim 5, wherein said waiting call managing means executes, when registering said call from said calling subscriber in said waiting call registering means, the steps of:

comparing the number of previous incomplete calls of said calling subscriber with that of waiting calls registered in said waiting call registering means;

giving a higher priority to the call from said calling subscriber than to a waiting call if the waiting call has a lower number of previous incomplete calls than that of said calling subscriber; and giving the lowest priority to the call from said calling subscriber if no waiting call exists having a lower number of previous incomplete calls than that of the calling subscriber.

8. The incoming call controller according to claim 4, wherein said waiting call managing means executes a step of informing said offering history registering means of the calling subscriber identification data of said waiting call when said waiting call registered in said waiting call registering means has been canceled; and said offering history managing means executes a step of retrieving said offering history registering means based on said calling subscriber identification data and increasing the number of previous incomplete calls of said calling subscriber by 1 to update said number of previous incomplete calls of said calling subscriber.

9. The incoming call controller according to claim 4, comprising message sending means for sending a message prompting the calling subscriber to input calling subscriber identification data thereof before registering the calling subscriber of the call which has been rejected to be connected with said called subscriber in said offering history registering means.

10. The incoming call controller according to claim 9, wherein calling terminal identification data for specifying a calling terminal for each waiting call is registered in a waiting queue registering section and said message sending means sends a message to the calling terminal for said waiting call by making reference to said calling terminal identification data in sending the message to the calling subscriber of said waiting call.

11. The incoming call controller according to claim 4, wherein said waiting call managing means updates the number of previous incomplete calls of waiting calls registered in said waiting call registering means at constant intervals.

12. The incoming call controller according to claim 4, wherein said waiting call registering means includes a main area for storing up to a predetermined number of waiting calls, and a sub-area for temporarily storing waiting calls, said waiting call managing means executing, when a call to be connected with said called subscriber is made and is responded to by a busy signal when the predetermined number of waiting calls have been stored in said main area, the steps of:

determining the calling subscriber identification data for specifying the calling subscriber of said call;

informing said offering history managing means of said calling subscriber identification data and updating the number of previous incomplete calls of said calling subscriber;

comparing the updated number of previous incomplete calls of said calling subscriber with the numbers of previous incomplete calls of the waiting calls stored in said main area to discriminate whether or not a waiting call having a lower number of previous incomplete calls than those of said calling subscriber exists;

giving a priority higher than that of a waiting call to the call of said calling subscriber if the waiting call has a lower number of previous incomplete calls than that of said calling subscriber;

registering a waiting call having the lowest priority among the waiting calls stored in said main area to said sub-area and at the same time, storing registered position information of said waiting call in said sub-area into said main area; and storing the call from said calling subscriber into said main area.

13. The incoming call controller according to claim 1, further comprising message sending means for informing calling subscribers of waiting calls registered in said waiting call registering means of their updated priority when the content in said waiting call registering means has been updated.

14. The incoming call controller according to claim 13, wherein calling terminal identification data for specifying a calling terminal of each waiting call is registered in a waiting queue registering section and said message sending means sends a message to the calling terminal of said waiting call by making reference to said calling terminal identification data in sending the message to the calling subscriber of said waiting call.

15. The incoming call controller according to claim 1, further comprising message sending means for sending a message prompting the calling subscriber to input calling subscriber identification data thereof before registering the call which has been rejected to be connected with said called subscriber in said waiting call registering means.

16. The incoming call controller according to claim 15, wherein calling terminal identification data for specifying a calling terminal for each waiting call is registered in a waiting queue registering section and said message sending means sends a message to the calling terminal for said waiting call by making reference to said calling terminal identification data in sending the message to the calling subscriber of said waiting call.

* * * * *